United States Patent
Jeon et al.

(10) Patent No.: US 8,841,899 B2
(45) Date of Patent: Sep. 23, 2014

(54) ELECTRO-MAGNETIC TOMOGRAPHY USING MODULATED SIGNAL

(75) Inventors: Soon-Ik Jeon, Daejeon (KR); Hyuk-Je Kim, Daejeon (KR); Seong-Ho Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 142 days.

(21) Appl. No.: 13/333,176

(22) Filed: Dec. 21, 2011

(65) Prior Publication Data

US 2012/0161024 A1 Jun. 28, 2012

(30) Foreign Application Priority Data

Dec. 22, 2010 (KR) ........................ 10-2010-0132325
Nov. 9, 2011 (KR) ........................ 10-2011-0116610

(51) Int. Cl.
*G01R 25/00* (2006.01)
*G01V 3/12* (2006.01)

(52) U.S. Cl.
CPC ........................................ *G01V 3/12* (2013.01)
USPC ........ 324/76.77; 324/323; 324/324; 324/325; 324/326; 324/375

(58) Field of Classification Search
USPC .................. 600/430; 324/76.77, 323–375
See application file for complete search history.

(56) References Cited

U.S. PATENT DOCUMENTS

| | | | | |
|---|---|---|---|---|
| 4,710,708 | A * | 12/1987 | Rorden et al. | ........... 324/207.26 |
| 7,460,833 | B2 * | 12/2008 | Lee et al. | ..................... 455/63.1 |
| 2002/0112855 | A1 * | 8/2002 | Arndt et al. | .............. 166/250.15 |
| 2005/0156787 | A1 | 7/2005 | Myoung et al. | |
| 2006/0128503 | A1 * | 6/2006 | Savarese et al. | ............. 473/353 |
| 2006/0166681 | A1 * | 7/2006 | Lohbihler | .................. 455/456.2 |
| 2006/0241410 | A1 * | 10/2006 | Fang et al. | ..................... 600/430 |
| 2008/0252532 | A1 | 10/2008 | Oh et al. | |
| 2009/0009407 | A1 | 1/2009 | Hong et al. | |
| 2009/0153425 | A1 | 6/2009 | Le Naour et al. | |
| 2010/0048266 | A1 | 2/2010 | Maruyama | |
| 2010/0265152 | A1 | 10/2010 | Kwak et al. | |

FOREIGN PATENT DOCUMENTS

| | | |
|---|---|---|
| KR | 2005-0071968 A | 7/2005 |
| KR | 2008-0073295 A | 8/2008 |
| KR | 2009-0049774 A | 5/2009 |
| KR | 2010-0022431 A | 3/2010 |

OTHER PUBLICATIONS

Tonny Rubæk et al., "Nonlinear Microwave Imaging for Breast-Cancer Screening Using Gauss-Newton's Method and the CGLS Inversion Algorithm", IEEE Transactions on Antennas and Propagation, vol. 55, No. 8, pp. 2320-2331, Aug. 2007.

\* cited by examiner

*Primary Examiner* — Huy Q Phan
*Assistant Examiner* — Temilade S Rhodes-Vivour
(74) *Attorney, Agent, or Firm* — Rabin & Berdo, P.C.

(57) ABSTRACT

Disclosed is an electro-magnetic tomography including: a modulator configured to modulate a generated transmit reference signal using a pseudo-noise signal; a transmitter configured to transmit the signal modulated by the modulator; a receiver configured to receive a signal transmitted from a transmitter; an amplitude detector configured to compare an amplitude magnitude between the signal received by the receiver and the transmit reference signal to measure a received amplitude; and a demodulator configured to demodulate the signal received by the receiver using the pseudo-noise signal to generate a cyclic signal, compare a phase between the transmit reference signal and the cyclic signal to measure the phase of the cyclic signal, and determine the phase of the received signal based on the phase of the measured cyclic signal.

10 Claims, 3 Drawing Sheets

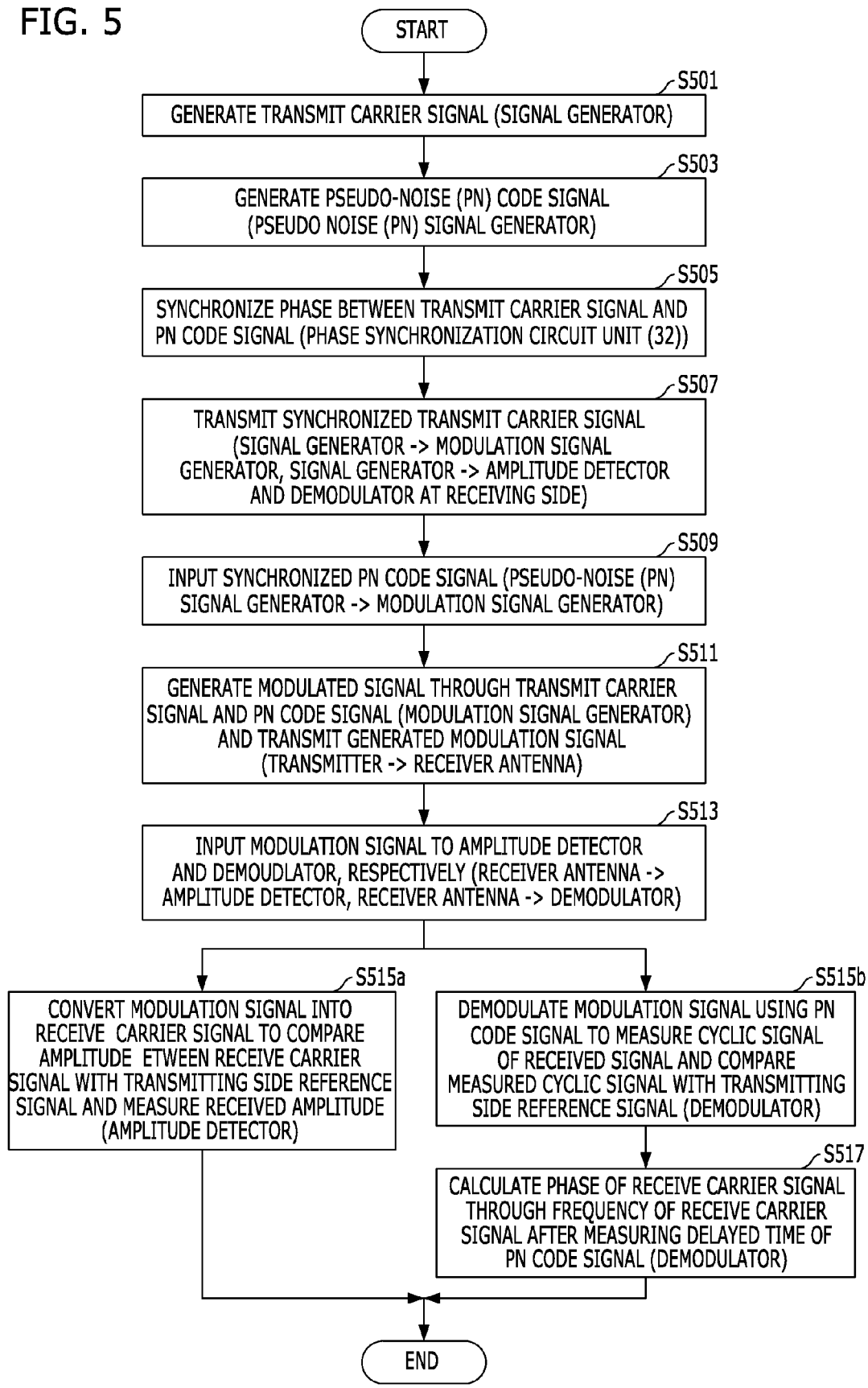

ELECTRO-MAGNETIC TOMOGRAPHY USING MODULATED SIGNAL

CROSS-REFERENCES TO RELATED APPLICATIONS

The present application claims priority of Korean Patent Application Nos. 10-2010-0132325 and 10-2011-0116610, filed on Dec. 22, 2010 and Nov. 9, 2011, respectively, which are incorporated herein by reference in their entireties.

BACKGROUND OF THE INVENTION

1. Field of the Invention

Exemplary embodiments of the present invention relate to an electro-magnetic tomography, and more particularly, to an electro-magnetic tomography capable of accurately measuring a phase of an electro-magnetic receive signal using modulated signals in a tomography using a measured electro-magnetic signal.

2. Description of Related Art

An electro-magnetic tomography is a technology that transmits an electro-magnetic wave from one point for electro-magnetic tomography, measures the transmission electro-magnetic wave through an object at a receiving point, and analyzes a phase and amplitude of the measured electro-magnetic wave, thereby acquiring a tomography image of an object.

FIG. 1 is a diagram for describing a phase measurement process in an electro-magnetic tomography in accordance with the related art.

As illustrated in FIG. 1, an electro-magnetic tomography system is configured to include a signal generator 10, a transmitter antenna 11, a receiver antenna 12, and a phase and amplitude detector 13.

Generally, in the phase measurement, the signal generator 10 to generate one continuous wave signal from frequency $f_1$ to frequency $f_N$ and propagate the generated one continuous signal through the transmitter antenna 11. Further, the signal generator 10 receives the same electro-magnetic wave propagated through the transmitter antenna from the receiver antenna and transmits the received electro-magnetic wave to the phase and amplitude detector 13. The phase and amplitude detector 13 measures the phase and amplitude by comparing the magnitude in the phase and amplitude between the continuous wave signal generated by the signal generator 10 at the transmitting side and the signal received through the receiver antenna. The tomography image is generated by applying an image reconfiguration method using the measured phase and amplitude.

FIG. 2 is a diagram for describing the phase measurement method in the electro-magnetic tomography in accordance with the related art and illustrates comparison results of period A and period B by using the above-mentioned phase measurement method of FIG. 1.

Reviewing the period A, when a wavelength of a frequency of a transmit carrier signal propagated from the transmitter antenna 11 is longer than distances d1, d2, and d3 between the transmitter antenna 11 and the receiver antennas 12, 13, and 14, if phases 18, 19, and 20 of a signal measured by setting the frequency starting points 15, 16, and 17 of the transmit carrier signal to a zero point do not exceed 180°, the amplitude and phase detector 13 can accurately measure the phases.

On the other hand, reviewing the period B, in the case of a high frequency signal in which the wavelength of the frequency of the transmit carrier signal starting the transmitter antenna 11 is shorter than the distance between the transmitter antenna 11 and the receiver antennas 12, 13, and 14, if phases 24, 25, and 26 of a signal measured by setting the frequency starting points 21, 22, and 23 of the transmit carrier signal to a zero point exceeds 180°, the amplitude and phase detector 13 cannot recognize the signal exceeding 180° and thus, has a problem of measurement phase ambiguity that does not accurately measure the phase in a 180°×N times+α (a residual value within 180°) type and outputs the phase in only the α (a residual value within) 180° type.

Due to the above problem, in the case of a high frequency signal in which the wavelength of the frequency of the transmit electro-magnetic wave is shorter than the distance between the transmitter antenna 11 and the receiver antennas 12, 13, and 14, the image reconfiguration calculation cannot be accurately performed and thus, the accurate image cannot be extracted at the time of the tomography.

SUMMARY OF THE INVENTION

An embodiment of the present invention is directed to an electro-magnetic tomography capable of acquiring phase measurement results robust against surrounding noises while preventing phase ambiguity errors using modulated signals in an electro-magnetic tomography using an electro-magnetic signal.

The objects of the present invention are not limited to the above-mentioned objects and therefore, other objects and advantages of the present invention that are not mentioned may be understood by the following description and will be more obviously understood by exemplary embodiments of the present invention. In addition, it can be easily appreciated that objects and advantages of the present invention may be implemented by means and a combination thereof described in claims.

In accordance with an embodiment of the present invention, there is provided an electro-magnetic tomography, including: a modulator configured to modulate a generated transmit reference signal using a pseudo-noise signal; a transmitter configured to transmit the signal modulated by the modulator; a receiver configured to receive a signal transmitted from a transmitter; an amplitude detector configured to compare an amplitude magnitude between the signal received by the receiver and the transmit reference signal to measure a received amplitude; and a demodulator configured to demodulate the signal received by the receiver using the pseudo-noise signal to generate a cyclic signal, compare a phase between the transmit reference signal and the cyclic signal to measure the phase of the cyclic signal, and determine the phase of the received signal based on the phase of the measured cyclic signal.

BRIEF DESCRIPTION OF THE DRAWINGS

FIG. 5 is a flow chart of the phase measurement method using modulated signals in the electro-magnetic tomography in accordance with the embodiment of the present invention.

DESCRIPTION OF SPECIFIC EMBODIMENTS

Figure 1:
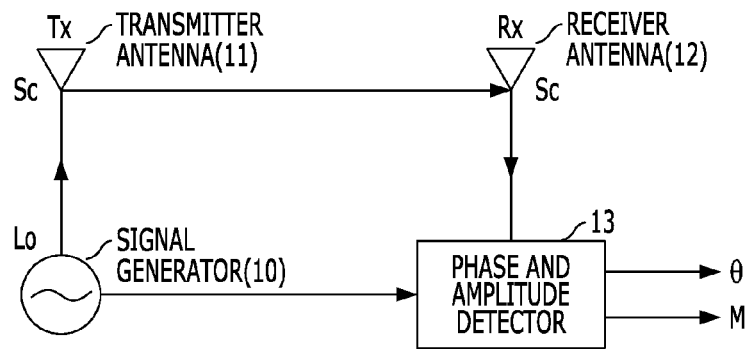
FIG. 1 is a diagram for describing a phase measurement process in an electro-magnetic tomography in accordance with the related art.
Figure 2:
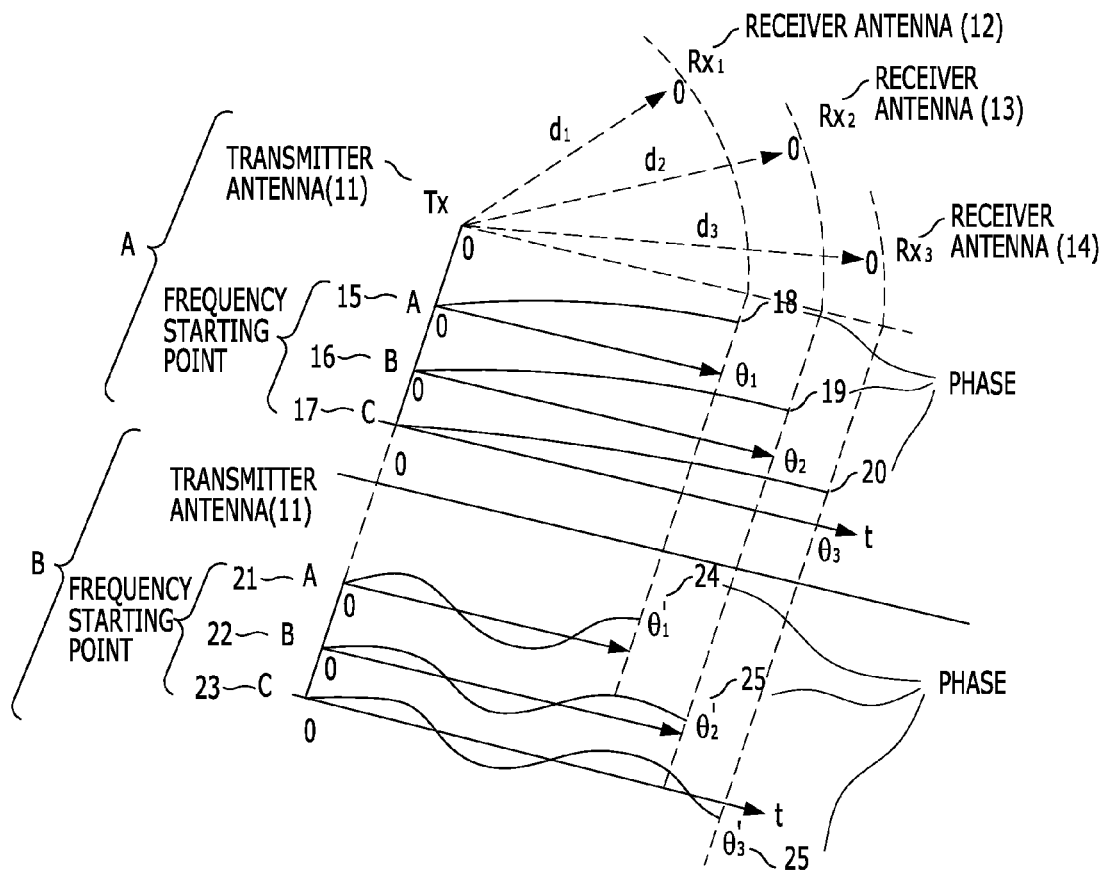
FIG. 2 is a diagram for describing a phase measurement method in the electro-magnetic tomography in accordance with the related art.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
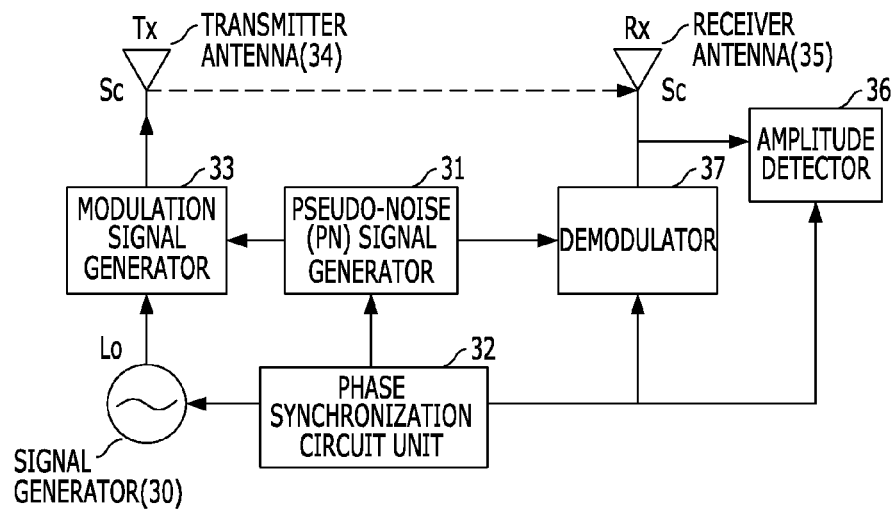
FIG. 3 is a configuration diagram of an electro-magnetic tomography in accordance with an embodiment of the present invention.

FIG. 3 is a configuration diagram of an electro-magnetic tomography in accordance with an embodiment of the present invention.

As illustrated in FIG. 3, in the electro-magnetic tomography system in accordance with the embodiment of the present invention, a transmitting side includes a signal generator 30, a pseudo-noise (PN) signal generator 31, a phase synchronization circuit unit 32, a modulation signal generator 33, and a transmitter antenna 34 and a receiving side includes a receiver antenna 35, a demodulator 37, and an amplitude detector 36.

In the embodiment of the present invention, the signal generator 30 is configured by a local oscillator and generates one continuous wave from frequency $f_1$ to frequency Fn. Further, the pseudo-noise (PN) signal generator 31 generates the pseudo-noise (PN) signal that has a frequency sufficiently lower than frequency $f_1$ to frequency $f_N$ and the wavelength of the frequency sufficiently longer than the distance between the transmitter antenna 34 and the receiver antenna 35. In this configuration, the phase synchronization circuit unit 32 is connected with the signal generator 30 and the pseudo-noise (PN) signal generator 31 to synchronize phases with each other.

The modulation signal generator 33 combines the continuous wave generated by the signal generator 30 with the PN code signal generated by the pseudo-noise (PN) signal generator 31 to generate the modulated signals, which are output through the transmitter antenna 34.

The receiver antenna 35 receives the modulated signals output through the transmitter antenna 34 and inputs the modulated signals to the amplitude detector 36 and the demodulator 37, respectively.

The amplitude detector 36 converts the modulated signals received from the receiver antenna 35 into the received continuous wave signal and compares an amplitude magnitude between the received continuous wave signal and a transmitting side reference signal generated by the signal generator 30 and transmitted to the receiving side to measure the received amplitude.

The demodulator 37 demodulates the modulated signals input from the receiver antenna using the PN code signal transmitted from the pseudo-noise (PN) signal generator 31 and generates the cyclic signal depending on the PN code signal demodulation. Further, the demodulator 37 compares the phase between the cyclic signal and the transmitting side reference signal transmitted from the signal generator 30 to measure the phase of the cyclic signal. And, the demodulator 37 calculates the cyclic signal into the phase of the received carrier signal using a delayed time t of the measured PN code signal generated by the pseudo-noise (PN) signal generator 31 and the frequency of the received carrier signal received from the receiver antenna 35 to acquire the phase of one continuous wave from frequency 2 to frequency fN, that is, the received carrier signal.

Figure 4:
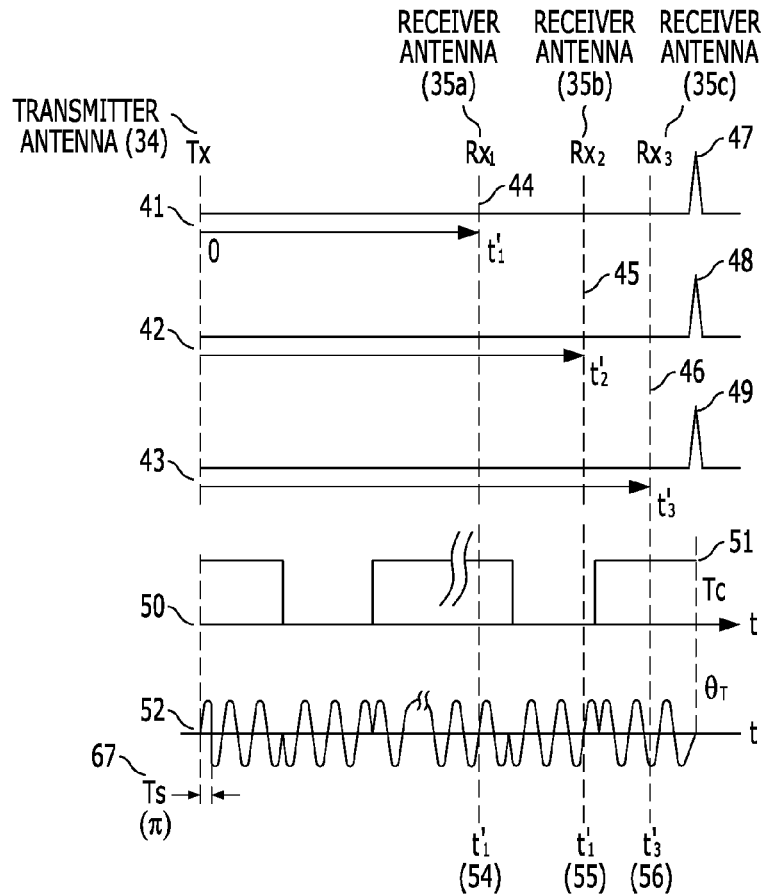
FIG. 4 is a diagram for describing a phase measurement method using modulated signals in the electro-magnetic tomography in accordance with the embodiment of the present invention.

FIG. 4 is a diagram for describing a phase measurement method using modulated signals in the electro-magnetic tomography in accordance with the embodiment of the present invention, which is described based on a configuration diagram of the above-mentioned phase measurement method of FIG. 3.

When a modulated signal 52 starting from signal starting points 41, 42, and 43 as a zero point in the transmitter antenna 34 reaches each receiver antennas 35a, 35b, and 35c, the demodulator 37 measures (47, 48, and 49) a cyclic signal 51 by receiving a PN code signal 50 and demodulating the PN code signal 50 from the pseudo-noise (PN) signal generator 31. Further, delayed time t' 44, 45, and 46 of the PN code signal may be measured by comparing the phase between the cyclic signals 47, 48, and 49 and the transmitting side reference signal input from the signal generator 30. When the conversion is performed by using the delayed time t' 44, 45, and 46 of the PN code signal and the frequency f of the received carrier signal (one from frequency $f_1$ to frequency fN) 54, 55, and 56, the phase 54, 55, and 56 ($\theta = 2\pi \cdot f \cdot t$) of the received carrier signal measured at each receiver antenna may be accurately measured.

The phase of the received carrier signal may be represented by the following Equation 1.

$$\theta = 2\pi \cdot f \cdot t \qquad \text{[Equation 1]}$$

Here, $\theta = 2\pi \cdot f \cdot t$ represents the frequency (one from frequency $f_1$ to frequency fN) of the received carrier signal and t represents the delayed time of the PN code signal.

This can accurately measure the phase even in the case of the signal in which the wavelength of the frequency of the transmit electro-magnetic wave is shorter than the distance between the transmitter antenna and the receiver antenna by converting the phases 47, 48, and 49 of the measured cyclic signals into the phases 54, 55, and 56 of the receive carrier signal.

FIG. 5 is a flow chart of the phase measurement method using modulated signals in the electro-magnetic tomography in accordance with the embodiment of the present invention.

The signal generator 30 generates one continuous wave (transmit carrier signal) from frequency $f_1$ to frequency $f_N$ (S501).

Further, the pseudo-noise (PN) signal generator 31 generates the pseudo-noise (PN) code signal that has a frequency sufficiently lower than frequency $f_1$ to frequency $f_N$ and the wavelength of the frequency sufficiently longer than the distance between the transmitter antenna 34 and the receiver antenna 35 (S503).

Further, the phase of the transmit carrier signal generated from the signal generator 30 and the phase the PN code signal generated from the pseudo-noise (PN) signal generator 31 are synchronized with each other by the phase synchronization circuit unit 32 (S505).

The signal generator 30 transmits the transmit carrier signal synchronized with the PN code signal by the phase synchronization circuit unit 32 to the modulation signal generator 33 and the amplitude detector 36 and the demodulator 37 at the receiving side (S507). Further, the pseudo-noise (PN) signal generator 31 inputs the PN code signal synchronized by the phase synchronization circuit unit 32 to the modulation signal generator 33 (S509).

The modulation signal generator 33 generates the modulated signal using the transmit carrier signal and the PN code signal and the generated modulated signal is transmitted to the receiver antenna 35 through the transmitter antenna 34 (S511).

The receiver antenna 35 receives the modulated signals transmitted through the transmitter antenna 34 and inputs the modulated signals to the amplitude detector 36 and the demodulator 37, respectively (S513).

The amplitude detector 36 converts the modulated signal into the received carrier signal and compares the amplitude between the received carrier signal and the transmitting side reference signal to measure the received amplitude (S515a).

The demodulator 37 demodulates the modulated signal using the PN code signal to measure the cyclic signal of the received signal, thereby comparing the phase between the cyclic signal and the transmitting side reference signal (S515b).

The demodulator 37 measures the delayed time of the PN code signal by comparing the phase between the cyclic signal and the transmitting side reference signal to calculate the phase of the received carrier signal through the delayed time of the PN code signal and the frequency of the received carrier signal (S517).

As set forth above, the phase measurement method using the modulated signals in the electro-magnetic tomography in accordance with the exemplary embodiments of the present invention can modulate the PN code signal having a long wavelength into the transmit electro-magnetic signal at the transmitting side to generate the modulated signals and transmit the modulated signals to the receiving side, generate the PN code signal among the modulated signals as the cyclic signal by the PN code demodulation at the receiving side and compare the cyclic signal with the transmit reference signal to measure the phase of the cyclic signal, and convert the measured phase into the phase at the transmit electro-magnetic signal frequency to accurately measure the phase, thereby solving the phase measurement ambiguity at the short and high frequency.

Further, the exemplary embodiments of the present invention can accurately perform the image reconfiguration calculation of the electro-magnetic tomography using the phase and amplitude information of the measured signal and accurately perform the tomography in the case of the high frequency signal in which the wavelength of the frequency of the transmit electro-magnetic is shorter than the distance between the transmitter antenna 11 and the receiver antenna 12, thereby acquiring the correct image.

While the present invention has been described with respect to the specific embodiments, it will be apparent to those skilled in the art that various changes and modifications may be made without departing from the spirit and scope of the invention as defined in the following claims.

What is claimed is:

1. An electro-magnetic tomography apparatus, comprising:
    a modulator configured to modulate a reference signal using a pseudo-noise signal to thereby generate a modulated signal;
    a transmitter configured to transmit the modulated signal;
    a receiver configured to receive the modulated signal transmitted from a transmitter;
    an amplitude detector configured to compare an amplitude magnitude of the modulated signal received by the receiver and that of the reference signal to thereby obtain a received amplitude; and
    a demodulator configured to demodulate the modulated signal received by the receiver using the pseudo-noise signal to thereby generate a cyclic signal, compare a phase of the reference signal and that of the cyclic signal to thereby measure the phase of the cyclic signal, and determine a phase of the received modulated signal based on the measured phase of the cyclic signal, wherein
    the pseudo-noise signal has a frequency that is lower than all frequencies of the reference signal, and a wavelength that is longer than a distance between the transmitter and the receiver.

2. The electro-magnetic tomography apparatus of claim 1, further comprising:
    a signal generator configured to generate the reference signal,
    a pseudo-noise signal generator configured to generate the pseudo-noise signal, and
    a phase synchronizer configured to synchronize a phase of the pseudo-noise signal.

3. The electro-magnetic tomography apparatus of claim 1, wherein the reference signal is one continuous wave.

4. The electro-magnetic tomography apparatus of claim 1, wherein the phase of the received modulated signal is a phase of one continuous wave.

5. The electro-magnetic tomography apparatus of claim 1, wherein the phase of the received modulated signal is a phase of a received carrier signal.

6. A method of performing electro-magnetic tomography, comprising:
    modulating a reference signal using a pseudo-noise signal to thereby generate a modulated signal;
    transmitting, by a transmitter, the modulated signal;
    receiving, by a receiver, the modulated signal transmitted from a transmitter;
    comparing an amplitude magnitude of the received modulated signal and that of the reference signal to thereby obtain a received amplitude; and
    demodulating the received modulated signal using the pseudo-noise signal to thereby generate a cyclic signal, comparing a phase of the reference signal and that of the cyclic signal to thereby measure the phase of the cyclic signal, and determining a phase of the received modulated signal using the measured phase of the cyclic signal, wherein
    the pseudo-noise signal has a frequency that is lower than all frequencies of the generated transmit reference signal, and a wavelength that is longer than a distance between the transmitter and the receiver.

7. The method of claim 6, further comprising generating the pseudo-noise signal, and synchronizing a phase of the pseudo-noise signal.

8. The method of claim 6, wherein the reference signal is one continuous wave.

9. The method of claim 6, wherein the phase of the received modulated signal is a phase of one continuous wave.

10. The method of claim 6, wherein the phase of the received modulated signal is a phase of a received carrier signal.

* * * * *